United States Patent [19]
Gerstch

[11] Patent Number: 5,118,926
[45] Date of Patent: Jun. 2, 1992

[54] DEVICE FOR SEPARATING A BEAM OF WHITE LIGHT INTO A PLURALITY OF ELEMENTARY BEAMS OF PARTICULAR COLOR

[75] Inventor: Franck Gerstch, Meylan, France

[73] Assignee: Kis Photo Industrie, Grenoble, France

[21] Appl. No.: 490,619

[22] PCT Filed: Aug. 9, 1989

[86] PCT No.: PCT/FR89/00414
§ 371 Date: Mar. 23, 1990
§ 102(e) Date: Mar. 23, 1990

[87] PCT Pub. No.: WO90/02355
PCT Pub. Date: Mar. 8, 1990

[30] Foreign Application Priority Data
Aug. 18, 1988 [FR] France ............... 88 11138

[51] Int. Cl.⁵ ................................ G01J 3/50
[52] U.S. Cl. ................ 250/226; 250/227.23; 356/405
[58] Field of Search ........... 250/226, 227.23; 356/405, 416, 446

[56] References Cited

U.S. PATENT DOCUMENTS 3,806,256  4/1974  Ishak ...................... 356/416
3,922,090  11/1975 Fain ....................... 356/416
4,223,216  9/1980  Quick et al. ............ 250/226
4,453,180  6/1984  Juergensen ............ 250/227.23
4,517,456  5/1985  Halsall et al. ......... 250/227.23
4,776,702  10/1988 Yamaba .................. 356/405
4,909,633  3/1990  Okui et al. ............. 250/227.23

Primary Examiner—David C. Nelms
Assistant Examiner—S. Allen
Attorney, Agent, or Firm—Sughrue, Mion, Zinn Macpeak & Seas

[57] ABSTRACT

A device for separating a beam of white light (14,56) into a plurality of elementary beams of particular color, integrated in a chromatic analyzer for the printing of color photographs, comprising
an optical sensor (15-17)
a plurality of photosensitive sensors (24-26), each sensor making it possible:
to collect the light (28,30,31) reflected by an optical system (21-23),
then to convert the light signal so received into an electrical signal,
and finally to amplify it (35-37);
a unit (38,39) for processing the amplified electrical signals,
wherein the optical system consists of a plurality of dichroic filters (21-23) of complementary color which are parallel and which are inclined relative to the optical axis (B) of the emerging beam (18), each filter making it possible to reflect the quantity of light corresponding to the color of this filter and to transmit the light in the other colors.

The invention is used on installations for the printing of photographic proofs.

8 Claims, 2 Drawing Sheets

DEVICE FOR SEPARATING A BEAM OF WHITE LIGHT INTO A PLURALITY OF ELEMENTARY BEAMS OF PARTICULAR COLOR

The invention relates to a device for separating a beam of white light into a plurality of elementary beams of specific color; it is concerned more particularly with a device of the type in question for the printing and development of photographic proofs and more especially in order, by means of a single light source, to feed on the one hand the densitometer and on the other hand the assembly for color analysis or even contrast analysis.

In other words, the invention involves separating a composite beam of white light into a series of elementary beams of particular wavelength segments, for the purpose of analyzing this white light into these various components.

French Patent Application 87.14,229 filed by the Applicant on Oct. 9, 1987 provides a device of the type in question which makes use of a plurality of optical fibers and of a scanning system. This solution remains complex in mechanical terms, makes it possible only with difficulty to obtain a uniform acquisition of the zone to be scanned, this resulting in non-uniformity in the measurement, and finally weakens the transmitted signal.

Japanese Patent JP-A-6,010,223 describes a device for separating a beam of white light into three components likewise of white light. These three components are converted into electrical signals by means of photosensitive sensors, after having passed through color filters for blue, green and red respectively, this being for the purpose of an analysis in terms of chromatic definition. It emerges that the use of such a device does not make it possible to obtain a sufficient output as regards the transmission of light flux for specific wavelengths to obtain a sufficiently accurate chromatic definition or analysis required for the printing of photographic proofs in high-quality color.

The invention overcomes these disadvantages. It aims at a device of the type in question which is simple to produce and reliable and in which the light transmitted in the various wavelength segments is uniform and easy to measure for purposes of analysis and of which the quantity in the various wavelength segments is sufficient for a given initial quantity of light.

This device for separating a beam of white light into a plurality of elementary beams of particular color, which is integrated in a chromatic analyzer for the printing of color photographs, comprises an optical sensor consisting of a calibrated aperture intended for collecting the directed beam of white light, in order to transmit it to an optical system in the form of a beam emerging from the said optical sensor;

a plurality of photosensitive sensors, each sensor making it possible:
to collect the light reflected by the optical system, then to convert the light signal so received into an electrical signal,
and finally to amplify this electrical signal;

a unit for processing the amplified electrical signals.

This device is defined in that the optical system consists of a plurality of dichroic filters of complementary color which are parallel and which are inclined relative to the optical axis of the emerging beam, each filter making it possible to reflect the quantity of light corresponding to the color of this filter and to transmit the light in the other colors.

In other words, the invention involves first calibrating the directed beam of white light to an optical system formed from complementary dichroic filters reflecting the light in their particular color, and then transmitting this specific wavelength band to photosensitive sensors converting this light signal into an electrical signal which is amplified and processed in the appropriate way.

Advantageously, in practice:

the dichroic filters are three in number and are used as half-mirrors, each associated with a complementary filter intended for eliminating the spurious components of the reflected part beam and for correcting this beam;

the optical sensor consists of a flexible optical fiber, that is to say of a bundle of parallel glass multifilaments, the endpiece of which forms a calibrated aperture;

the mirrors are inclined at 45° relative to the optical axis obtained from the optical sensor;

each photosensitive sensor consists of a photodiode, a phototransistor or the like and is associated with a logarithmic amplifier making it possible to obtain an electrical output signal proportional to the optical density to be measured;

the analog, hence logarithmic electrical signals obtained are subsequently converted into a digital signal by means of an analog/digital (A/D) converter, and these digital signals will be processed by a microprocessor;

in a first embodiment, the device according to the invention is intended to constitute a reflection densitometer. For this purpose, the beam of white light is a light beam obtained from a single source of uniform light reflected on a photographic proof;

in a second embodiment, the device according to the invention constitutes a color analysis assembly. For this purpose, the beam of white light is a light beam obtained from a source of uniform white light transmitted directly to the optical sensor and passing through the negative film to be printed. In this embodiment, advantageously the directed beam of uniform white light is previously mixed before it passes through the negative film to be printed, in order to obtain an intense, diffuse and uniform light at the exit;

in a third advantageous embodiment, the optical sensor is likewise associated with a contrast analysis assembly consisting of a second plurality of optical fibers associated at the entrance with a diaphragm and at the exit with an identical plurality of photodiode/amplifier subassemblies, and the electrical signals emitted are subsequently converted into digital signals by means of the same analog/digital converter as before, in order to be processed by the same computation assembly.

The way in which the invention can be put into practice and the advantages arising from it will emerge more clearly from the two following exemplary embodiments given as a non-limiting indication and with reference to the three accompanying Figures.

These two exemplary embodiments relate to an installation for the printing of photographic proofs of a negative film.

Figure 1:
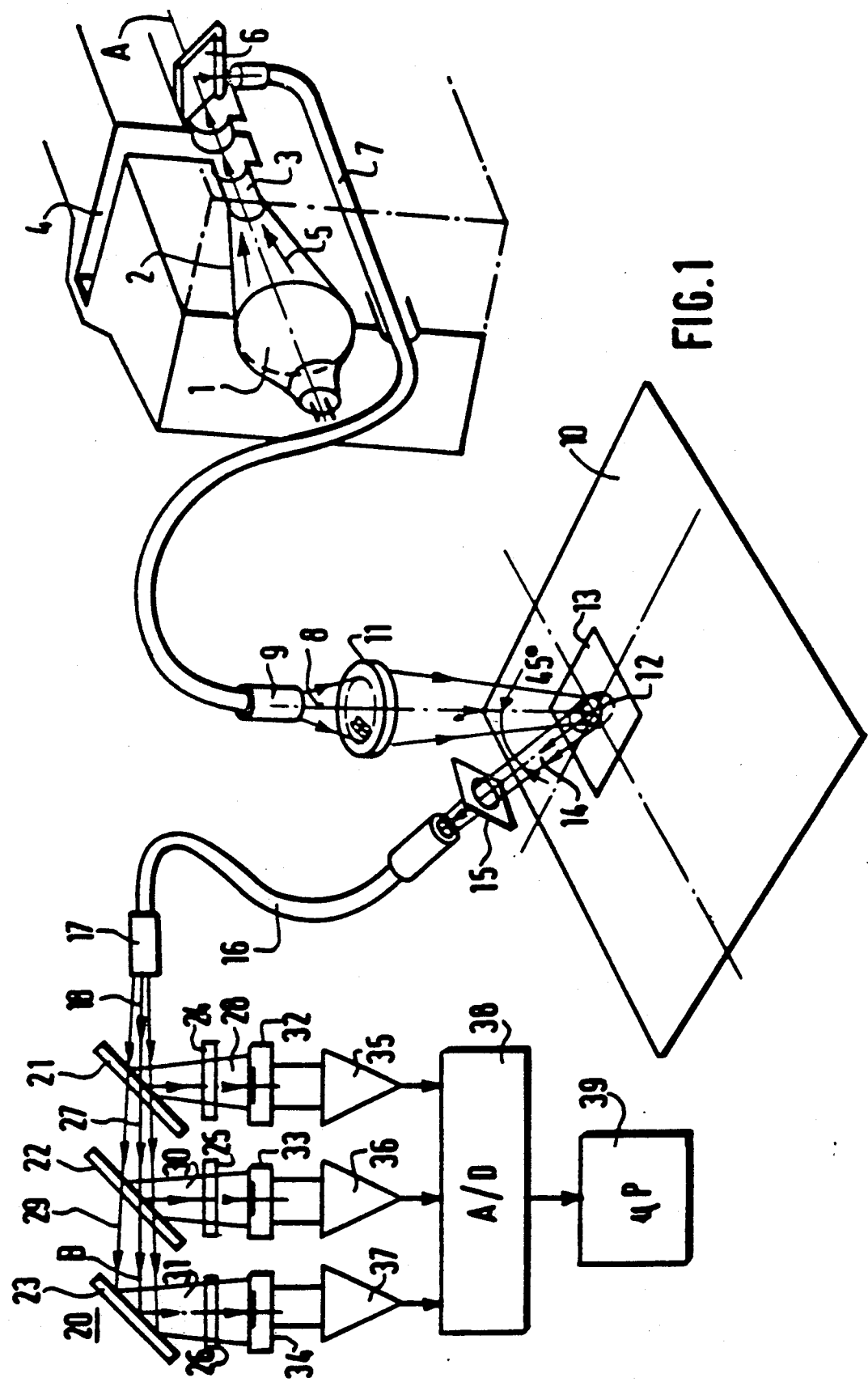
FIG. 1 shows a concise perspective view of a device according to the invention in its use as a reflection densitometer.

An exposure lamp (1), for example of the halogen type, emits a light beam (2), the optical axis of which is represented by the general reference (A). After passing through a condenser (3) and a rotary filter system in the slit (4), the light beam (5) meets a retractable mirror (6) which it deflects [sic] towards an optical fiber (7) so as to bring it to the appropriate location in the vicinity of the specimen photographic proof designated by the general reference (10). The beam (8) coming from the endpiece (9) of the optical fiber (7) is a slightly divergent uniform cone of white light. This cone then passes through a condenser (11) intended for refocusing this cone (8) so as to form a spot (12) of small size illuminated intensely. The analyzed surface designated by the general reference (13) is therefore a reflecting surface diffusing in all directions. For the requirements of measurement, only the light (14) reflected at 45° by the specimen proof (10) is picked up. The reflected light (14) passes through an aperture of a first calibration diaphragm (15) and is then transmitted, by an optical fiber (16) formed from a bundle of parallel elementary glass multifilaments, to a suitable location for carrying out the measurement. The transmitted beam (18) to be analyzed and coming from the endpiece (17) of the optical fiber (16) has an optical axis symbolized by the general reference (B). This beam (18), like the beam (8), is a slightly divergent uniform beam of white light. According to a first characteristic of the invention, this beam (18) is transmitted to an optical system designated by the general reference (20) consisting of three half-mirrors (21,22,23) inclined at 45° relative to the optical axis (B) and forming dichroic filters, the first (21) yellow, the second (22) magenta and the third (23) cyan respectively. These dichroic filters (21,22,23) of complementary color, inclined relative to the optical axis (B) of the emerging beam (18), are each associated with a respective complementary filter (24,25,26) intended for eliminating spurious components of the reflected part beam and for correcting this elementary beam. The yellow filter (21) transmits the yellow light (27) (red and green) and reflects at 90° the blue light (28) which subsequently passes through the complementary blue filter (24) so as to eliminate the spurious components.

Likewise, the following magenta filter (22) transmits the red light (29) and reflects (30) at 90° the green light which passes through the green filter (25) again. In the same way, the third cyan filter (23) reflects at 90° (31) the red light which likewise passes through a red filter (26).

According to a second characteristic of the invention, each of the reflected elementary beams (28, 30,31) is associated with a respective optical sensor (32,33,34), itself associated with an amplifier (35,36, 37). These photosensitive sensors (32–34), consisting, for example, of photodiodes, phototransistors or the like, convert the electrical [sic] signal (28,31,32) into an electrical signal and convert it into an output signal proportional to the density to be measured, by means of the logarithmic amplifier (35,36,37). The analog, hence logarithmic electrical signals obtained are converted into a digital signal by means of an analog/digital A/D converter (38) which transmits them to a microprocessor (39) which analyzes and processes them.

These logarithmic signals are directly proportional to the red, green and blue densities to be measured. These signals are converted into optical densities. The latter are subsequently compared with the stored reference values, in order to make the necessary corrections.

In a second type of use, the device according to the invention is employed to analyze the color and contrast of the passing negative film (40) to be printed. In the same way, the retractable mirror (6) transmits the directed uniform beam of white light to an optical fiber (51), more exactly to a bundle of parallel optical fibers. The beam (52) coming from the endpiece (53) passes through a mixing prism (54), the exit face (55) of which is ground and diffusing, so as to obtain an intense, diffuse and uniform white light at the exit. This beam (56) passes through the film to be analyzed (40), and then first of all passes through a diaphragm (57) formed by the entrance of an acquisition cone (58) associated with the endpiece (59) of an optical fiber (60). In the same way as (17), the endpiece (61) sends an emerging beam (62) transmitted to an optical system designated by the general reference (63) and, as before, consisting of three parallel dichroic filters, (64,65,66), yellow, magenta and cyan respectively, associated with complementary filters (67,68,69), themselves associated with photosensitive sensors (70,71,72), with logarithmic amplifiers (73,74,75) and with an analog/digital A/D converter (76) and a microprocessor (77), the arrangement as a whole being similar to (21-39).

In other words, in the color analysis version (FIG. 2), a transmitted beam (56) is processed, whereas in the densitometer version a reflected beam (14) is processed.

Figures 2, 3:
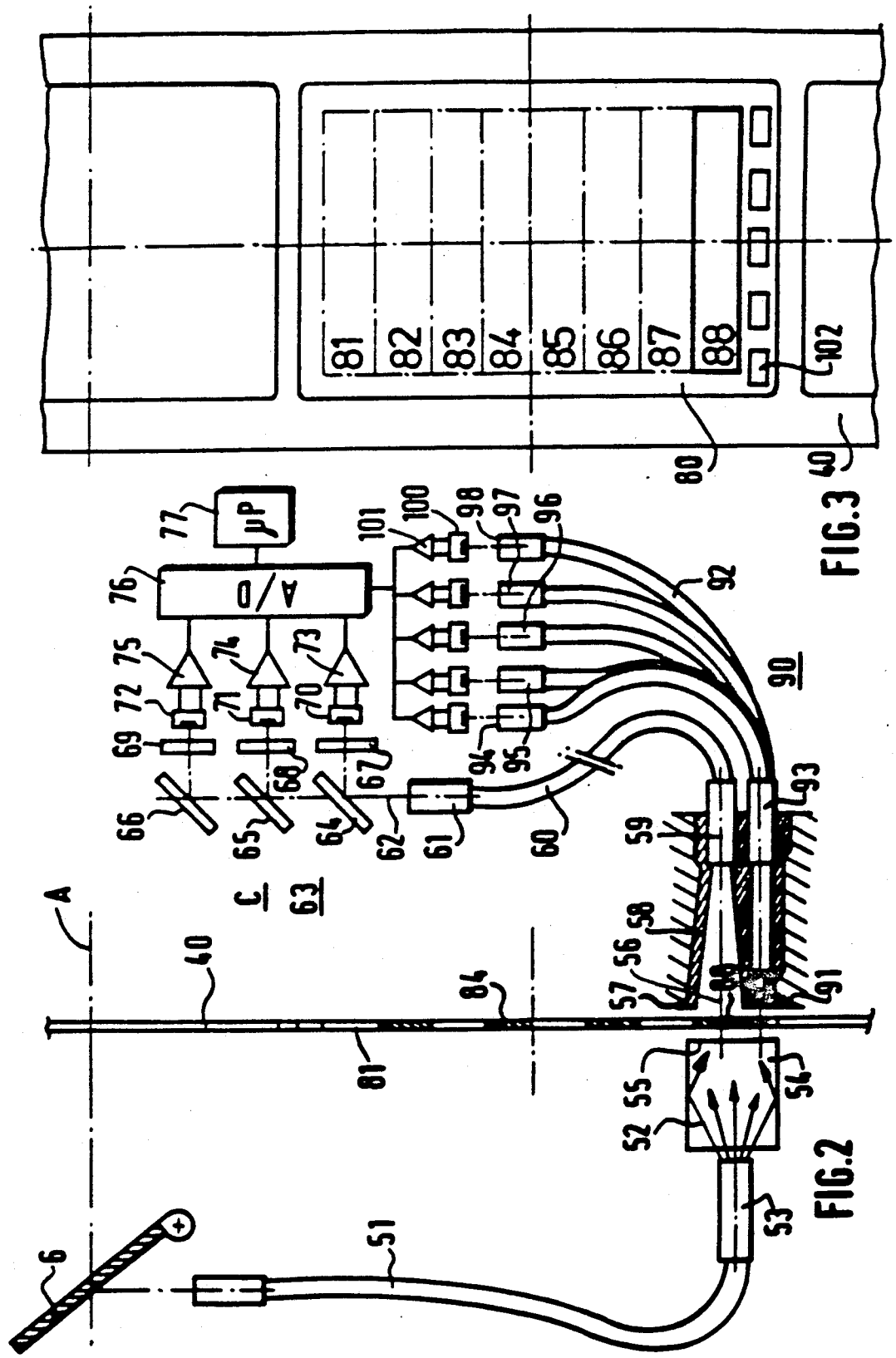
FIG. 2 is a sectional representation relating to use for analyzing the color and contrast of the negative film to be printed.
FIG. 3 is a front view showing the positioning of the various optical members in relation to the passing film.

The view (80) of the passing film (40) (FIG. 3) is divided into eight equal horizontal segments designated by (81) to (88) in FIGS. 2–3. These views (81,88) pass in front of the optical sensor (57,58,59), the dimensions of which, in one embodiment, can be 22 mm × 4 mm. Periodically, the information transmitted by each of the segments (81,88) is measured, that is to say the passing view (80) is scanned continuously and all the information collected is transmitted to the microprocessor (77). This microprocessor (77) extracts three density values, namely red, green and blue, eight times and computes the general density of the view (80) in terms of grey, red, green and blue by means of suitable software. The microprocessor (77) subsequently determines the main printing parameters and thus controls the exposure data, particularly of the lamp (1), through the filters of the filtering disk which are not shown, but which rotate in the slit (4).

In an improved embodiment, the optical sensor (57,59) is associated with another optical sensor system, designated by the general reference (90), comprising a first diaphragm (91) which transmits part of the beam (56) to a system consisting of five optical fibers (91), of which the entry endpieces (93) are associated with (91) and the respective exit endpieces (94,98) are associated with five photosensitive cells (100) similar to (70–72) and to (32–34) and, as before, associated with amplifiers (101), but transmitting the electrical analog signal to the analog/digital converter (76) and from there to the microprocessor (77).

Each of the endpieces (93) reads the information at the locations designated by (102) on the view (80). This contrast analysis arrangement makes it possible to modify the printing parameters as a function of the contrast parameters of the negatives and thereby correct the general density of printing of the film (40). The device according to the invention has many advantages over those marketed hitherto Mention may be made of:

the considerable simplification in the construction of the sensor;

the possibility of miniaturizing the assembly as a whole;

the possibility of converting the light signal into an electrical signal far from the measuring point, thus making it possible to locate the electronic apparatus at an ideal spot;

the possibility of eliminating the problems associated with the transmission of weak electrical signals;

the possibility of obtaining a high light-flux transmission output for each of the colors during the chromatic analysis;

finally, the high uniformity of the measurement.

I claim:

1. A device for separating a directed beam of white light (14, 56) into a plurality of elementary beams of a particular color comprising:

an optical sensor (15-17; 57-61) comprising means including a calibrated aperture (15, 57) collecting said directed beam of light (14, 56) and transmitting said directed beam of light to an optical system (21-23; 64-66), said optical system constituting three dichroic half-mirror filters (21-23; 64-66) of complementary color positioned parallel to each other and inclined at 45° relative to an optical axis (B, C) of an emerging beam (18, 62), each filter reflecting a quantity of light corresponding to the color of said filter and transmitting light in the other colors;

a plurality of photosensitive sensors (24-26; 67-69) positioned respectively in the path of reflected light from said three dichroic half-mirror filters, such that each sensor collects the light (28, 30, 31) reflected by a respective filter (21-23; 64-66), and converts a light signal so received into an electrical signal, means for amplifying said electrical signals (35-37; 73-75), and each of said sensors being operatively associated with said filters (21-23) for eliminating spurious components of a relfected part beam (28, 30, 31) and for correcting the reflected part beam;

a means (38, 76; 39, 77) for processing the amplified electrical signals, and said device constituting a reflection densitometer and said beam of white light (14) being a single source light beam (1, 8) of uniform light (12) reflected onto a photographic proof (10).

2. The device as claimed in claim 1, wherein each photosensitive sensor (23-34; 70-72) consists of a photodiode operatively coupled to a logarithmic amplifier (35-37; 73-75) to provide an electrical output signal proportional to the optical density of the light beam being measured.

3. The device as claimed in claim 2, wherein said logarithmic amplifier is connected to an analog/digital (A/D) converter (38, 76), and said analog/digital converter is connected to a microprocessor (39, 77).

4. A device for separating a divided beam of white light (14, 56) into a plurality of elementary beams of a particular color comprising:

an optical sensor (15-17; 57-61) comprising means including a calibrated aperture (15, 57) collecting said directed beam of light (14, 56) and transmitting said directed beam of light to an optical system (21-23; 64-66), said optical system constituting three dichroic half-mirror filters (21-23; 64-66) of complementary color positioned parallel to each other and inclined at 45° relative to an optical axis (B, C) of an emerging beam (18, 62), each filter reflecting a quantity of light corresponding to the color of said filter and transmitting light in the other colors;

a plurality of photosensitive sensors (24-26; 67-69) positioned respectively in the path of reflected light from said three dichroic half-mirror filters, such that each sensor collects the light (28, 30, 31) reflected by a respective filter (21-23; 64-66), and converts a light signal so received into an electrical signal, means for amplifying said electrical signal (35-37; 73-75), and each of said sensors being operatively associated with said filters (21-23) for eliminating spurious components of a reflected part beam (28, 30, 31) and for correcting the reflected part beam;

means (38, 76; 39, 77) for processing the amplified electrical signals, and said device constituting a transmission densitometer for a color analysis assembly for a negative film (40) to be printed, and said beam of white light (52) being obtained from a single source light beam (1) of uniform white light transmitted through said negative film (40) directly to the optical sensor (57).

5. The device as claimed in claim 4, wherein the optical sensor is operatively associated with a contrast analysis assembly consisting of a second plurality of optical fibers (92) associated at an entrance end thereof with a diaphragm (91) and at an exit end thereof with an identical plurality of photodiode (100)/amplifier (101) subassemblies respectively, and an analog/digital converter (76) commonly connected to said identical plurality of photodiode (100)/amplifier (101) subassemblies and said means for amplifying said electrical signals emanating from said plurality of photosensitive sensors (24-26; 67-69).

6. The device as claimed in claim 4, wherein the optical sensor consists of a flexible optical fiber (16, 60, 92) having an endpiece (59) which forms said calibrated aperture.

7. The device as claimed in claim 4, wherein each photosensitive sensor (32-34; 70-72) is operatively connected to a logarithmic amplifier (35-37; 73-75) for providing an electrical output signal proportional to the output density being measured.

8. The device as claimed in claim 7, further comprising an analog/digital (A/D) converter (38, 76) electrically connected to said logarithmic amplifier for converting analog electrical signals into digital signals, and wherein said analog/digital (A/D) converter (38, 76) is electrically connected to a microprocessor (39, 77) for processing said digital signals.

* * * * *

UNITED STATES PATENT AND TRADEMARK OFFICE
CERTIFICATE OF CORRECTION

PATENT NO. : 5,118,926
DATED : June 2, 1992
INVENTOR(S) : Franck Gerstch

It is certified that error appears in the above-identified patent and that said Letters Patent is hereby corrected as shown below:

Col. 5, line 34, before "color", insert

--complementary--.

Signed and Sealed this

Nineteenth Day of April, 1994

Attest:

BRUCE LEHMAN

*Attesting Officer*   *Commissioner of Patents and Trademarks*